United States Patent
Stallmo et al.

[11] Patent Number: 5,911,779
[45] Date of Patent: *Jun. 15, 1999

[54] STORAGE DEVICE ARRAY ARCHITECTURE WITH COPYBACK CACHE

[75] Inventors: David C. Stallmo; William A. Brant, both of Boulder, Colo.

[73] Assignee: EMC Corporation, Hopkinton, Mass.

[ * ] Notice: This patent is subject to a terminal disclaimer.

[21] Appl. No.: 08/825,625

[22] Filed: Mar. 31, 1997

Related U.S. Application Data

[63] Continuation of application No. 08/579,545, Dec. 27, 1995, Pat. No. 5,617,530, which is a continuation of application No. 08/112,791, Aug. 26, 1993, Pat. No. 5,526,482, which is a continuation-in-part of application No. 07/638,167, Jan. 4, 1991, Pat. No. 5,274,799.

[51] Int. Cl.$^6$ ................................................. G06F 11/10
[52] U.S. Cl. ............................ 714/6; 711/114; 711/113; 395/182.03
[58] Field of Search .......................... 395/182.04, 441, 395/182.05, 182.07, 440, 182; 371/40.4, 51.1; 711/114, 113

[56] References Cited

U.S. PATENT DOCUMENTS

| | | | |
|---|---|---|---|
| 3,893,178 | 7/1975 | Sordello | 360/73.02 |
| 4,092,732 | 5/1978 | Ouchi | 395/182.03 |
| 4,430,701 | 2/1984 | Christian et al. | 711/119 |
| 4,467,421 | 8/1984 | White | 711/118 |
| 4,562,576 | 12/1985 | Ratcliffe | 395/185.02 |
| 4,593,354 | 6/1986 | Ushiro | 395/185.01 |
| 4,604,750 | 8/1986 | Manton | 371/40.2 |
| 4,667,326 | 5/1987 | Young et al. | 371/39.1 |
| 4,722,085 | 1/1988 | Flora et al. | 371/40.15 |
| 4,733,396 | 3/1988 | Baldwin | 371/40.2 |

(List continued on next page.)

FOREIGN PATENT DOCUMENTS

| | | |
|---|---|---|
| 0416968A2 | 8/1990 | European Pat. Off. . |
| 59-153251 | 9/1984 | Japan . |
| 62-110902 | 5/1987 | Japan . |
| WO89909468 | 10/1989 | WIPO . |

OTHER PUBLICATIONS

Patterson, D.A., Gibson, G., and Katz, H.; A Case For Redundant Arrays of Inexpensive Disks (RAID) (Jun. 1, 1988).

Lee, E.K.; Software and Performance Issues in the Implementation of a RAID Prototype (May 1990).

Chen, P., Gibson, G., Katz, R.H., Patterson, D.A., and Schulze, M.; Introduction to Redundant Arrays of Inexpensive Disks (RAID) (Dec. 1988).

(List continued on next page.)

*Primary Examiner*—Ly Hua
*Attorney, Agent, or Firm*—William J. Kubida; Robert H. Kelly; Holland & Hart LLP

[57] ABSTRACT

A fault-tolerant storage device array using a copyback cache storage unit for temporary storage. When a Write occurs to the RAID system, the data is immediately written to the first available location in the copyback cache storage unit. Upon completion of the Write to the copyback cache storage unit, the host CPU is immediately informed that the Write was successful. Thereafter, further storage unit accesses by the CPU can continue without waiting for an error-correction block update for the data just written. In a first embodiment of the invention, Read-Modify-Write operations are performed during idle time. In a second embodiment of the invention, normal Read-Modify-Write operation by the RAID system controller continue use Write data in the controller's buffer memory. In a third embodiment, at least two controllers, each associated with one copyback cache storage unit, copy Write data from controller buffers to the associated copyback cache storage unit. If a copyback cache storage unit fails, more than one controller share a single copyback storage unit. In a fourth embodiment, Write data is copied from a controller buffer to a reserved area of each storage unit comprising the array.

25 Claims, 10 Drawing Sheets

U.S. PATENT DOCUMENTS

| | | | |
|---|---|---|---|
| 4,754,397 | 6/1988 | Varaiya et al. | 361/685 |
| 4,761,785 | 8/1988 | Clark et al. | 395/182.04 |
| 4,768,193 | 8/1988 | Takemae | 371/10.3 |
| 4,775,978 | 10/1988 | Hartness | 371/40.15 |
| 4,791,642 | 12/1988 | Taylor | 371/40.2 |
| 4,817,035 | 3/1989 | Timsit | 395/185.07 |
| 4,849,929 | 7/1989 | Timsit | 395/182.03 |
| 4,870,643 | 9/1989 | Bultman et al. | 395/182.05 |
| 4,899,342 | 2/1990 | Potter et al. | 395/182.04 |
| 4,914,656 | 4/1990 | Dunphy, Jr. et al. | 371/10.2 |
| 4,920,539 | 4/1990 | Albonesi | 371/40.2 |
| 4,958,351 | 9/1990 | Flora | 371/40.15 |
| 4,993,030 | 2/1991 | Krakauer et al. | 395/182.04 |
| 4,995,041 | 2/1991 | Hetherington | 371/40.11 |
| 5,058,116 | 10/1991 | Chao | 371/40.2 |
| 5,185,876 | 2/1993 | Nguyen et al. | 395/84 |
| 5,274,799 | 12/1993 | Brant et al. | 395/182.04 |
| 5,341,381 | 8/1994 | Fuller | 395/182.04 |
| 5,398,253 | 3/1995 | Gordon | 371/40.4 |
| 5,548,711 | 8/1996 | Brant et al. | 395/182.03 |

OTHER PUBLICATIONS

Chen, P., Gibson, G., Katz, R.H., Patterson, D.A., and Schulze, M., et al.; Evolution of the Raid 2 Architecture (Jun. 12, 1990).

Chen, P., Gibson, G., Katz, R.h., Patterson, D.A., and Schulze, M.; How Reliable is RAID? (Feb. 1988).

Maximum Strategy, Inc., San Jose, CA; Strategy 2 Disk Array Controller Operation Manual (Nov. 2, 1988).

Maximum Strategy, Inc., San Jose, CA; Strategy 1 Disk Array Controller Operation Manual (Date Unknown).

Gibson, G.A., Performance and Reliability in Redundant Arrays of Inexpensive Disks (Date Unknown).

Chen, P., An Evaluaiton of Redundant Arrays of Disks Using an Amdahl 5890; (May 1989).

Katz, R.H., Gibson, G.A. and Patterson, D.A.; Disk System Architectures for High Performance Computing (Mar. 1989).

Gray, J., Horst, B., and Walker, M.; Parity Striping and Disc Arrays: Low–Cost Reliable Storage with Acceptable Throughput (Jan. 1990).

Schultz, M.E.; Considerations in the Design of Raid Prototype (Aug. 1988).

Clark and Corrigan; IBM Systems Journal, vol. 28, No. 3, 1989.

Schulze, M., et al.; "How Reliable is RAID?"; COMPCOM, Spring 1989, pp. 1–12.

Ousterhout, J., and Douglis, F., Beating the I/O Bottleneck: A Case for Log–Structured File Systems (Aug. 4, 1988).

STORAGE DEVICE ARRAY ARCHITECTURE WITH COPYBACK CACHE

RELATED APPLICATION

This application is a continuation of application Ser. No. 08/579,545 for IMPROVED STORAGE DEVICE ARRAY ARCHITECTURE WITH COPYBACK CACHE, filed Dec. 27, 1995, to issue Apr. 1, 1997 as U.S. Pat. No. 5,617,530. Ser. No. 08/579,545 was a continuation of Ser. No. 08/112,791, filed Aug. 26, 1993, now U.S. Pat. No. 5,526,482. Ser. No. 08/112,791 was a continuation-in-part of application Ser. No. 07/638,167 of William A. Brant, filed Jan. 4, 1991, entitled Storage Device Array Architecture With Copyback Cache, now U.S. Pat. No. 5,274,799.

BACKGROUND OF THE INVENTION

1. Field of the Invention

This invention relates to computer system data storage, and more particularly to a fault-tolerant storage device array using a copyback cache storage unit for temporary storage.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various type of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units.

Other approaches to such "external" reliability have been described in the art. A research group at the University of California, Berkeley, in a paper entitled "A Case for Redundant Arrays of Inexpensive Disks (RAID)", Patterson, et al., *Proc. ACM SIGMOD*, June 1988, has catalogued a number of different approaches for providing such reliability when using disk drives as storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives (this is also known as "bit striping"). For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement also effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" sequence.

Thus, a Read and a Write on the single parity unit occurs each time a record is changed on any of the data storage units covered by the parity record on the parity unit. The parity unit becomes a bottle-neck to data writing operations since the number of changes to records which can be made per unit of time is a function of the access rate of the parity unit, as opposed to the faster access rate provided by parallel operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

Thus, no single disk drive is used for storing the parity information, and the bottle-neck of the RAID 4 architecture is eliminated. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising two Read and two Write operations: the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole.

Despite the Write performance penalty, RAID 5 type systems have become increasingly popular, since they provide high data reliability with a low overhead cost for redundancy, good Read performance, and fair Write performance. However, it would be desirable to have the benefits of a RAID 5 system without the Write performance penalty resulting from the rotational latency time imposed by the parity update operation.

The present invention provides such a system.

SUMMARY OF THE INVENTION

The present invention solves the error-correction block bottleneck inherent in a RAID 5 architecture by recognition that storage unit accesses are intermittent. That is, at various times one or more of the storage units in a RAID 5 system are idle in terms of access requests by the CPU. This characteristic can be exploited by providing a "copyback cache" storage unit as an adjunct to a standard RAID system. The present invention provides four alternative methods of operating such a system.

In each embodiment, when a Write occurs to the RAID system, the data is immediately written to the first available location in the copyback cache storage unit. Upon completion of the Write to the copyback cache storage unit, the host CPU is immediately informed that the Write was successful. Thereafter, further storage unit accesses by the CPU can continue without waiting for an error-correction block update for the data just written.

In the first embodiment of the invention, during idle time for relevant storage units of the storage system, an error-correction block (e.g., XOR parity) is computed for each "pending" data block on the copyback cache storage unit, and the data block and corresponding error-correction block are copied to their proper location in the RAID system. Optionally, if a number of pending data blocks are to be written to the same stripe, an error-correction block can be calculated from all data blocks in the stripe at one time, thus achieving some economy of time. In this embodiment, the copyback cache storage unit in effect stores "peak load" Write data and then completes the actual Read-Modify-Write operations to the RAID system during relatively quiescent periods of I/O accesses by the CPU.

In the second embodiment of the invention, after Write data is logged to the copyback cache storage unit, normal Read-Modify-Write operation by the RAID system controller continues in overlapped fashion with other CPU I/O accesses, using Write data in the array controller's buffer memory. Thus, there are at least two redundant copies of each pending data block. Performance is enhanced because the CPU can continue processing as soon as the simple Write operation to the copyback cache storage unit completes, thus eliminating the delay caused by a normal Read-Modify-Write RAID system. In this embodiment, the copyback cache storage unit acts more as a running "log" of Write data. Data integrity and redundancy is preserved since the Write data is saved to the copyback cache storage unit and thus accessible even if the Read-Modify-Write operation from the controller buffer to the RAID system never completes.

In the third embodiment of the invention, one or more logical arrays of storage units are defined. Each logical array of storage units is associated with at least one controller. When Write data is presented to a controller, the data is immediately stored in a controller buffer. Each controller buffer is associated with a unique copyback cache storage unit. A copy of the data stored in the controller buffer is written to its associated copyback cache storage unit. Thus, there are at least two redundant copies of each pending data block. The CPU is informed that the Write operation was successfully completed immediately after the data is written to the copyback cache storage unit. Data blocks are only read from a copyback cache storage unit upon a failure of the associated controller buffer. In one alternative embodiment, each copyback cache unit is logically divided into at least two logical areas, so that if a copyback cache storage unit fails, another copyback cache storage unit associated with another logical array can be shared by two logical arrays.

In the fourth embodiment of the invention, no physical storage unit is assigned as a copyback cache unit. Rather, at least one logical strips within each of the storage units that comprise the array is reserved for storing a copy of the pending blocks of data in the controller buffer. As is the case in the third embodiment, pending data blocks are read only from the controller buffer during Read-Modify-Write operations unless the controller buffer has failed.

The copyback cache storage unit is preferably non-volatile, so that data will not be lost on a power failure. If the copyback cache storage unit is a disk drive, it may be paired with a "mirror" storage unit for additional fault tolerance. Optionally, the copyback cache storage unit may be a solid-state storage unit, which can achieve substantially faster Write and error-correction block update times than a disk drive.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiments and examples shown should be considered as exemplars, rather than as limitations on the present invention.

Figure 1:
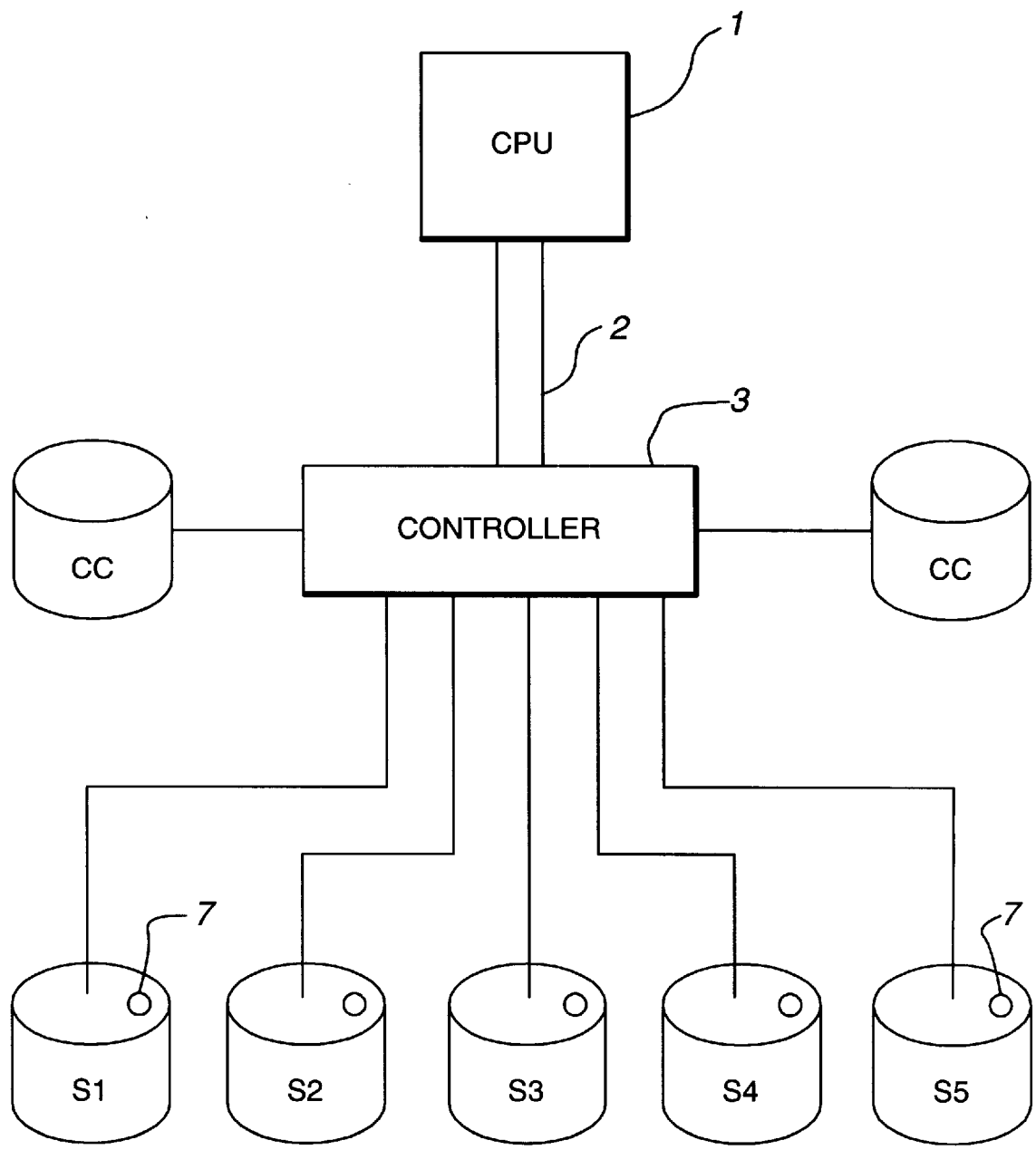
FIG. 1 is block diagram of a copyback cache RAID system in accordance with the present invention.

FIG. 1 is block diagram of a copyback cache RAID system in accordance with the present invention. Shown are a CPU 1 coupled by a bus 2 to an array controller 3, which in the preferred embodiment is a fault-tolerant controller. The array controller 3 is coupled to each of the plurality of storage units S1–S5 (five being shown by way of example only) by an I/O bus (e.g., a SCSI bus). The array controller 3 preferably includes a separately programmable processor (for example, the MIPS R3000 RISC processor, made by MIPS of Sunnyvale, Calif.) which can act independently of the CPU 1 to control the storage units.

The storage units S1–S5 are failure independent, meaning that the failure of one unit does not affect the physical operation of other units. Optionally, the storage units S1–S5 are disk drive units including solid state storage unit buffers 7. Such solid state storage unit buffers 7 allow data to be written by a controller to a disk drive without encountering the delay associated with disk rotational latency of a disk drive. Data that is written to the solid state storage unit buffer 7 is preferably written from the solid state storage unit buffer 7 to the rotating medium of the disk drive unit as soon as possible.

Also attached to the controller 3 is a copyback cache storage unit CC, which in the preferred embodiment is coupled to the common I/O bus (e.g., a SCSI bus) so that data can be transferred between the copyback cache storage unit CC and the storage units S1–S5. The copyback cache storage unit CC is preferably non-volatile, so that data will not be lost on a power failure. If the copyback cache storage unit CC is a disk drive, it may be paired with a "mirror" storage unit CC' for additional fault tolerance. The mirror storage unit CC' is coupled to the controller 3 such that all data written to the copyback cache storage unit CC is also written essentially simultaneously to the mirror storage unit CC', in known fashion. Optionally, the copyback cache storage unit CC may be a solid-state storage unit, which can achieve substantially faster Write and error-correction block update times than a disk drive. In such a case, the solid-state storage unit preferably includes error-detection and correction circuitry, and is either non-volatile or has a battery backup on the power supply.

The storage units S1–S5 can be grouped into one or more redundancy groups. In the illustrated examples described below, the redundancy group comprises all of the storage units S1–S5, for simplicity of explanation.

Figure 2A:
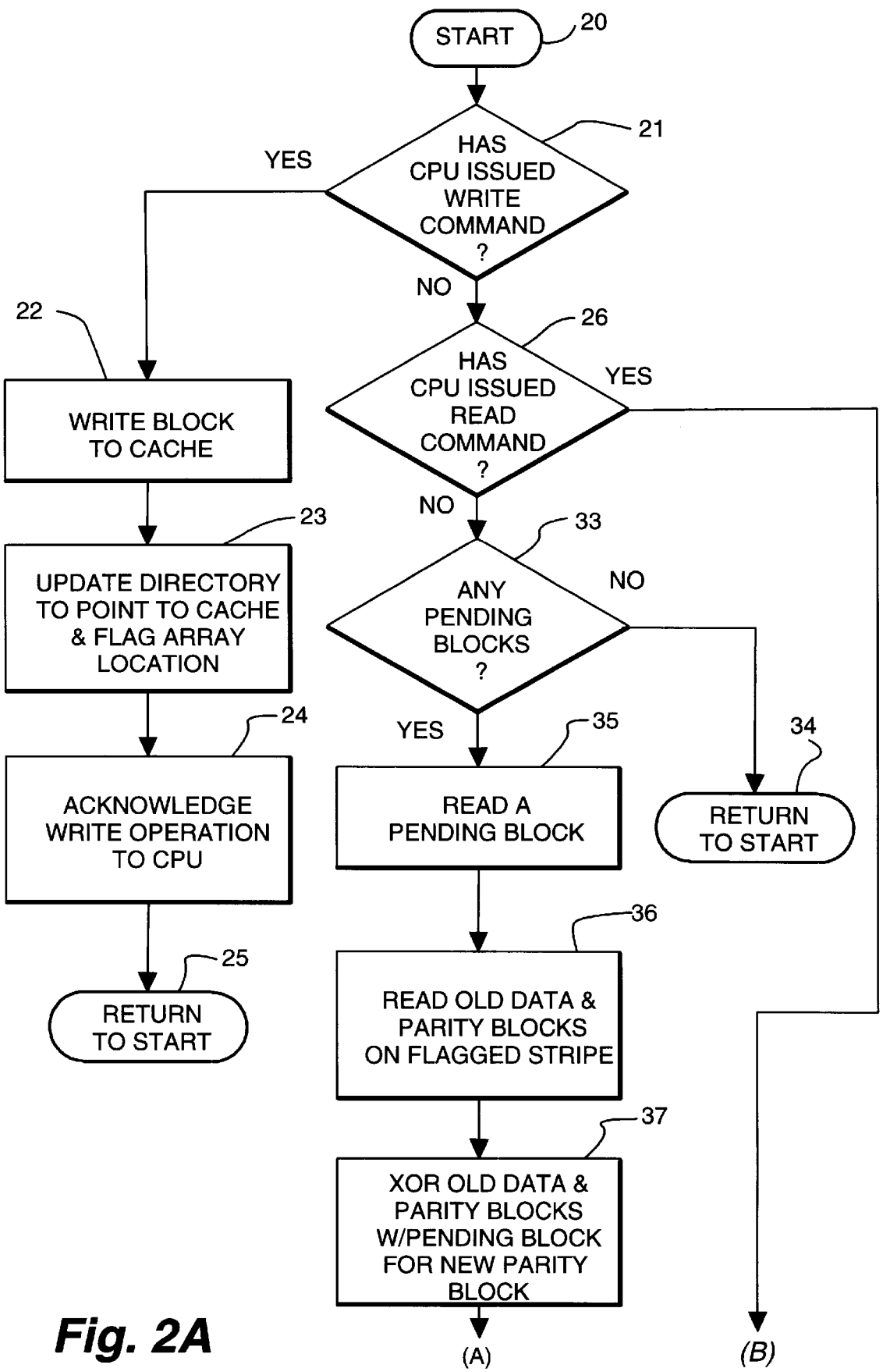
FIGS. 2A and 2B is a flow-chart of Read and Write operation in accordance with a first embodiment of the present invention.
Figure 2B:
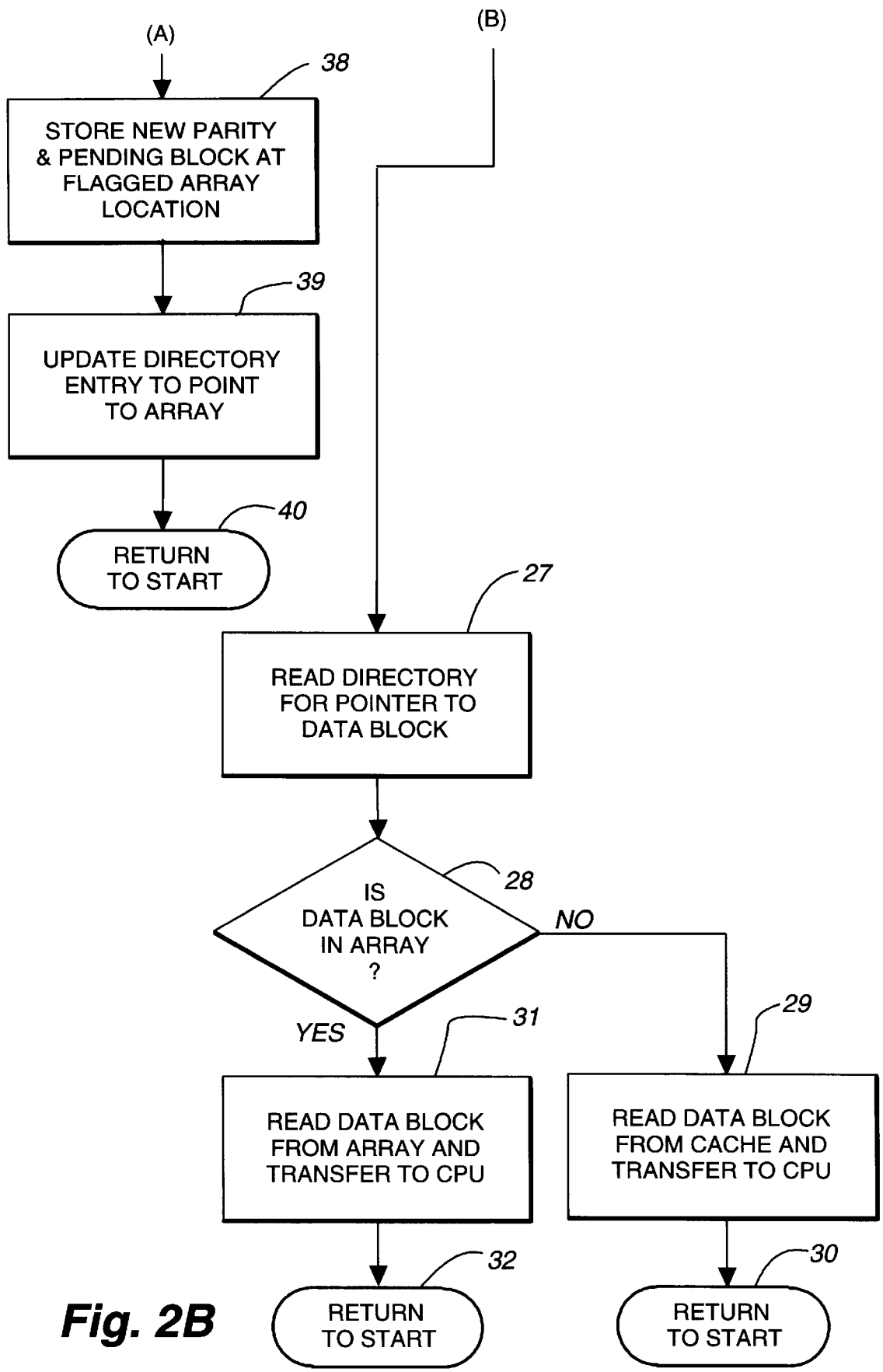
Figure 3A:
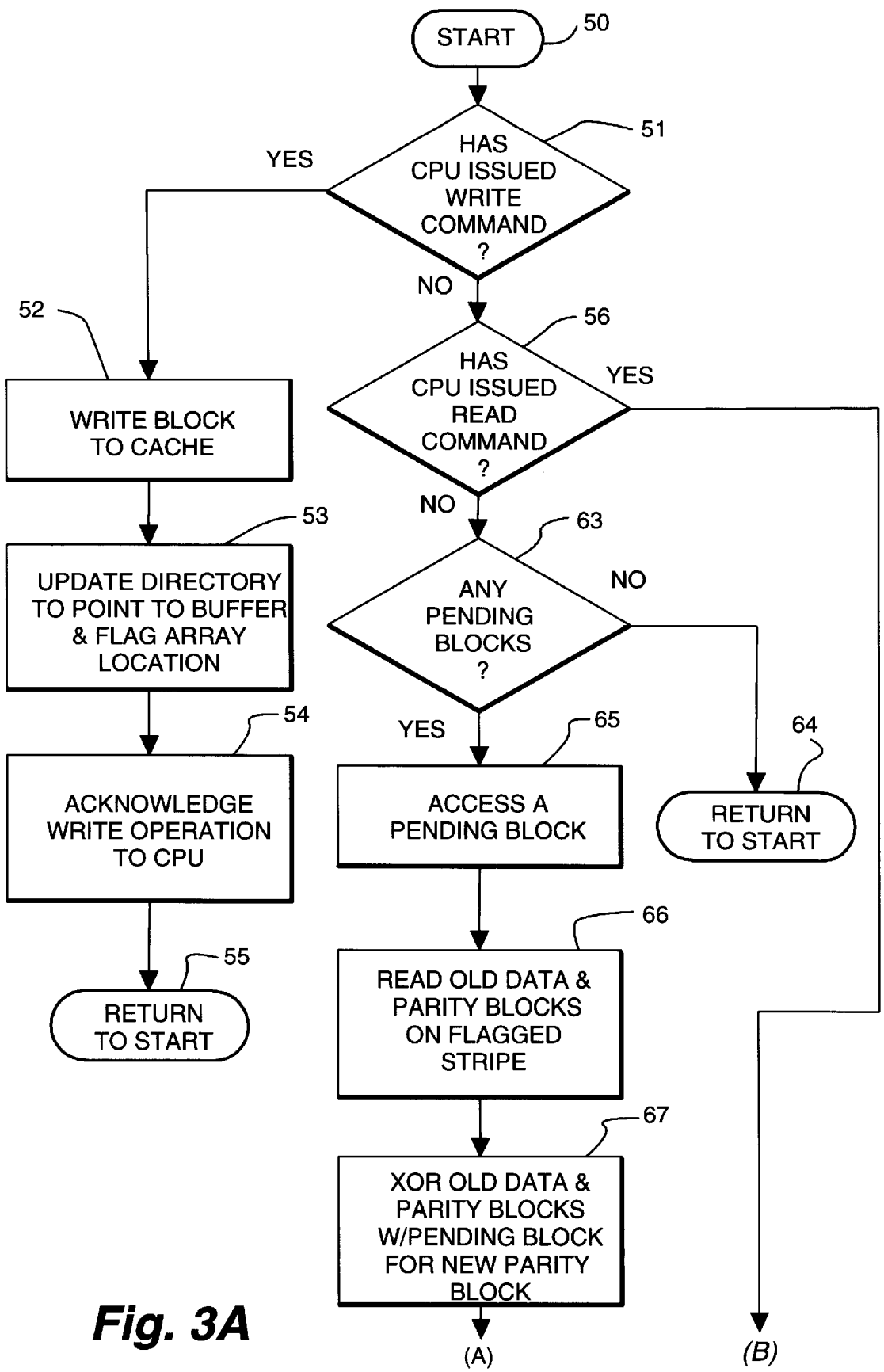
FIGS. 3A and 3B is a flow-chart of Read and Write operation in accordance with a second embodiment of the present invention.
Figure 3B:
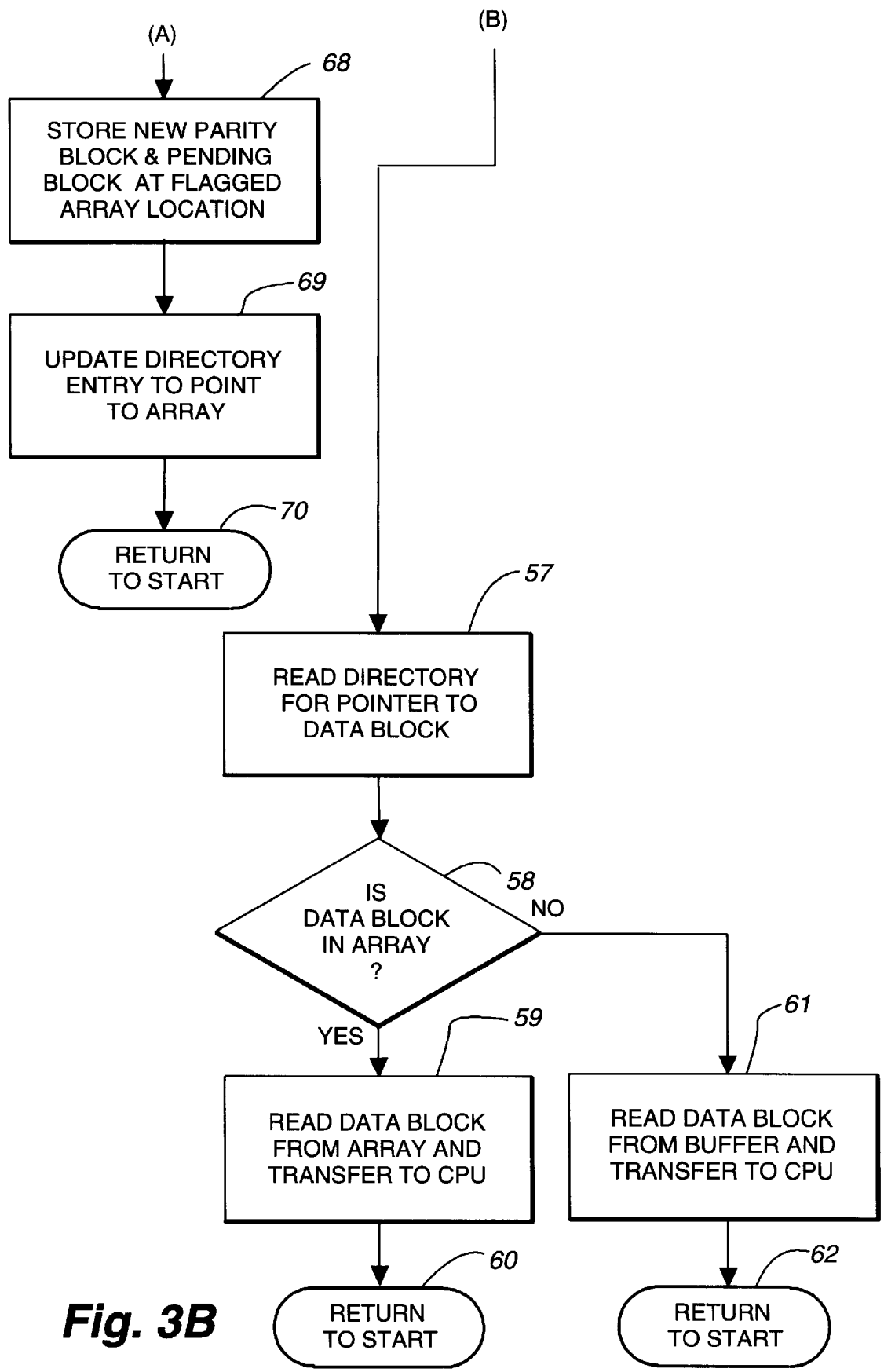

The present invention is preferably implemented as a computer program executed by the controller 3. FIGS. 2A and 2B is a high-level flowchart representing the steps of the Read and Write processes for a first embodiment of the invention. FIGS. 3A and 3B is a high-level flowchart representing the steps of the Read and Write processes for a second embodiment of the invention. The steps shown in FIGS. 2A, 2B, 3A, and 3B are referenced below.

The Peak Load Embodiment

The controller 3 monitors input/output requests from the CPU 1 on essentially a continuous basis (Step 20). If a Write request is pending (Step 21), the data block is immediately written to the first available location in the copyback cache storage unit CC (Step 22) (the data block is also stored on the mirror storage unit CC', if present). Preferably, writing begins at the first logical block on the copyback cache storage unit CC, and continues sequentially to the end of the logical blocks. Thereafter, writing commences again at the first block (so long as no blocks are overwritten that have not been stored in the array). This preferred method minimizes time-consuming SEEK operations (i.e., physical movements of a Read/Write head in a storage unit) in the copyback cache storage unit CC.

Each data block stored on the copyback cache storage unit CC is also flagged with the location in the array where the data block is ultimately to be stored, and a pointer is set to indicate that the data block is in the copyback cache storage unit CC (Step 23). This location and pointer information is preferably kept in a separate table in memory or on the copyback cache storage unit CC. The table preferably comprises a directory table having entries that include standard information regarding the size, attributes, and status of each data block. In addition, each entry has one or more fields indicating whether the data block is stored on the copyback cache storage unit CC or in the array (S1–S5), and the "normal" location in the array for the data blocks. Creation of such directory tables is well-known in the art.

It a data block is written to the copyback cache storage unit CC while a data block to be stored at the same location in the array is still a "pending block" (a data block that has been Written to the copyback cache storage unit CC but not transferred to the array S1–S5), the directory location pointer for the data block is changed to point to the "new" version rather than to the "old" version. The old version is thereafter ignored, and may be written over in subsequent operations.

After a Write request is processed in this fashion, the controller 3 immediately sends an acknowledgement to the CPU 1 indicating that the Write operation was successful (Step 24). The monitoring process then repeats (Step 25).

Further storage unit accesses by the CPU 1 can continue without waiting for an error-correction block update to the array S1–S5 for the data block just written. Thus, the Write throughput time of the array appears to be the same as a non-redundant system, since storage of the Write data on the copyback cache storage unit CC does not require the Read-Modify-Write sequence of a standard RAID system with respect to operation of the CPU 1.

If a Write request is not pending (Step 21), the controller 3 tests whether a Read request is pending (Step 26). If a Read request is pending, the controller 3 reads the directory table to determine the location of each requested data block (Step 27). If a requested data block is not in the array (Step 28), the controller 3 reads the block from the copyback cache storage unit CC and transfers it to the CPU 1 (Step 29). The monitoring process then repeats (Step 30). If the requested data block is in the array (Step 28), the controller 3 reads the block from the array (S1–S5) in normal fashion and transfers it to the CPU 1 (Step 31). The monitoring process then repeats (Step 32).

Some embodiments of the invention may include disk cache memory in the controller 3. Read requests may of course be Transparently satisfied from such a cache in known fashion.

If no Write or Read operation is pending for particular storage units in the array, indicating that those storage units are "idle" with respect to CPU 1 I/O accesses, the controller 3 checks to see if any data blocks are "pending blocks" flagged to locations on the idle storage units. If no pending blocks exist (Step 33), the controller 3 begins the monitoring cycle again (Step 34).

If a pending block does exist (Step 33), the controller 3 reads a pending block from the copyback cache storage unit CC (Step 35). The controller 3 then writes the pending block to the proper location in the array, and computes and stores a new error-correction block based upon the pending block.

In the preferred embodiment of the invention, the error-correction blocks contain parity information. Thus, update of the error-correction block for the pending block can be accomplished by reading the old data block and old error-correction block corresponding to the array location indicated by the location information for the pending block stored in the directory (Step 36). The controller 3 then XOR's the old data block, the pending data block, and the old error-correction block to generate a new error-correction block (Step 37). The new error-correction block and the pending block are then written to the array S1–S5 at their proper locations (Step 38).

Optionally, If a number of pending blocks are to be written to the same stripe, error-correction can be calculated for all data blocks in the stripe at one time by reading all data blocks in the stripe that are not being updated, XOR'ing those data blocks with the pending blocks to generate a new error-correction block, and writing the pending blocks and the new error-correction block to the array. This may achieve some economy of time.

After the pending block is transferred from the copyback cache storage unit CC to the array, the directory entry for that block is modified to indicate that the data block is in the array rather than in the copyback cache storage unit CC (Step 39). Thereafter, the controller 3 begins the monitoring cycle again (Step 40).

Although the invention has been described in terms of a sequential branching process, the invention may also be implemented in a multi-tasking system as separate tasks executing concurrently. Thus, the Read and Write processes described above, as well as the transfer of pending data blocks, may be implemented as separate tasks executed concurrently. Accordingly, the tests indicated by Steps 21, 26, and 33 in FIGS. 2A and 2B may be implicitly performed in the calling of the associated tasks for Writing and Reading data blocks, and transfer of pending blocks. Thus, for example, the transfer of a pending block from the copyback cache storage unit CC to a storage unit in the array may be performed concurrently with a Read operation to a different storage unit in the array. Further, if the array is of the type that permits the controller 3 to "stack" a number of I/O requests for each storage unit of the array (as is the case with many SCSI-based RAID systems), the operations described above may be performed "concurrently" with respect to accesses to the same storage unit.

The Data Log Embodiment

As in the embodiment describe above, the controller 3 monitors input/output requests from the CPU 1 on essentially a continuous basis (Step 50). In this embodiment, the controller 3 is provided with a relatively large (for example, one megabyte or more) data buffer to temporarily store data to be written to the array. If a Write request is pending (Step 51), the data block is immediately written by the controller 3 to the first available location in the copyback cache storage unit CC (Step 52) (the data block is also stored on the mirror storage unit CC', if present). Preferably, writing begins at the first logical block on the copyback cache storage unit CC, and continues sequentially to the end of the logical blocks. Thereafter, writing commences again at the first block (so long as no blocks are overwritten that have not been stored in the array). This preferred method minimizes SEEK operations in the copyback cache storage unit CC.

In the first embodiment, SEEK operations are required to retrieve pending blocks during idle times to transfer to the array. In the second embodiment, the copyback cache storage unit CC acts as a running "log" of Write data. In contrast with the first embodiment, SEEK operations normally are necessary only to change to a next data-writing area (e.g., a next cylinder in a disk drive) when the current area is full, or to reset the Read/Write head back to the logical beginning of the storage unit after reaching the end, or to retrieve data blocks after a failure.

Each data block stored on the copyback cache storage unit CC is also flagged with the location in the array where the data block is ultimately to be stored and the location of the data block in the copyback cache storage unit CC, and a pointer is set to indicate that the data block is in the controller buffer (Step 53). As before, such location and pointer information is preferably kept in a directory table.

Because of the buffer in the controller 3, the definition of a "pending block" in the second embodiment differs somewhat from the definition in the first embodiment described above. A "pending block" is a data block that has been Written to the copyback cache storage unit CC but not transferred from the controller buffer to the array S1–S5.

If a data block is written to the copyback cache storage unit CC while a data block to be stored at the same location in the array is still a "pending block" in the controller buffer, the directory location pointers for the data block are changed to point to the "new" version rather than to the "old" version both in the copyback cache storage unit CC and in the buffer. The old version is thereafter ignored, and may be written over in subsequent operations.

After a Write request is processed in this fashion, the controller 3 immediately sends an acknowledgement to the CPU 1 indicating that the Write operation was successful (Step 54). The monitoring process then repeats (Step 55). Further storage unit accesses by the CPU 1 can continue without waiting for an error-correction block update for the data block just written. Thus, the Write response time of the array appears to be the same as a non-redundant system, since storage of the Write data on the copyback cache storage unit CC does not require the Read-Modify-Write sequence of a standard RAID system with respect to operation of the CPU 1.

If a Write request is not pending (Step 51), the controller 3 tests whether a Read request is pending (Step 56). If a Read request is pending, the controller 3 reads the directory table to determine the location of each requested data block (Step 57). If a requested data block is in the array (Step 58), the controller 3 reads the block from the array (S1–S5) in normal fashion and transfers it to the CPU 1 (Step 59). The monitoring process then repeats (Step 60).

If a requested data block is not in the array (Step 58), it is in the buffer of the controller 3. The controller 3 transfers the data block from its buffer to the CPU 1 (Step 61). This operation is extremely fast compared to the first embodiment, since the buffer operates at electronic speeds with no mechanically-imposed latency period. The monitoring process then repeats (Step 62).

If no Write or Read operation is pending for particular storage units in the array, indicating that those storage units are "Idle" with respect to CPU 1 I/O accesses, the controller 3 checks to see if any data blocks in its buffer are "pending blocks" flagged to locations on the idle storage units. If no pending blocks exist (Step 63), the controller 3 begins the monitoring cycle again (Step 64).

If a pending block does exist (Step 63), the controller 3 accesses the pending block (Step 65), and then computes and stores a new error-correction block based upon the pending block. As before, in the preferred embodiment of the invention, the error-correction blocks contain parity information. Thus, update of the error-correction block for the pending block can be accomplished by reading the old data block and old error-correction block corresponding to the array location indicated by the location information for the pending block stored in the directory (Step 66). The controller 3 then XOR's the old data block, the pending data block, and the old error-correction block to generate a new error-correction block (Step 67). The new error-correction block and the pending block are then written to the array S1–S5 (Step 68).

Optionally, if a number of pending blocks are to be written to the same stripe, error-correction can be calculated for all data blocks in the stripe at one time by reading all data blocks in the stripe that are not being updated, XOR'ing those data blocks with the pending blocks to generate a new error-correction block, and writing the pending blocks and the new error-correction block to the array. This may achieve some economy of time.

After the pending block is transferred from the buffer of the controller 3 to the array, the directory is modified to indicate that the pending block is no longer valid in the copyback cache storage unit CC or in the buffer (Step 69). The old pending block is thereafter ignored, and may be written over in subsequent operations. The controller 3 then restarts the monitoring cycle (Step 70).

If a failure to the system occurs before all pending blocks are written from the buffer to the array, the controller 3 can read the pending blocks from the copyback cache storage unit CC that were not written to the array. The controller 3 then writes the selected pending blocks to the array.

Again, although the invention has been described in terms of a sequential branching process, the invention may also be implemented in a multi-tasking system as separate tasks executing concurrently. Accordingly, the tests indicated by Steps 51, 56, and 63 in FIGS. 3A and 3B may be implicitly performed in the calling of the associated tasks for Writing and Reading data blocks, and transfer of pending blocks.

The present invention therefore provides the benefits of a RAID system without the Write performance penalty resulting from the rotational latency time imposed by the standard error-correction update operation, so long as a non-loaded condition exists with respect to I/O accesses by the CPU 1. Idle time for any of the array storage units is productively used to allow data stored on the copyback cache storage unit CC to be written to the array (either from the cache itself, or from the controller buffer) during moments of relative inactivity by the CPU 1, thus improving overall performance.

Furthermore, in many RAID systems, a "hot spare" storage unit is provided to immediately substitute for any active storage unit that fails. The present invention may be implemented by using such a "hot spare" as the copyback cache storage unit CC, thus eliminating the need for a storage unit dedicated to the copyback cache function. If the "hot spare" is needed for its primary purpose, the RAID system can fall back to a non-copyback caching mode of operation until a replacement disk is provided.

Overview of Copyback Cache for Use with Multiple Controllers

In a RAID system having more than one array controller, a copyback cache system can be implemented to minimize the amount of time required to acknowledge a complete Write operation to the array. In one embodiment of the present invention, a controller buffer, such as a solid state buffer, is provided within each controller. Pending data blocks received by a controller are immediately stored in the controller buffer. Concurrently, a copy of the pending data block is written to a copyback cache storage unit which is preferably associated with one controller. A header and a trailer are also preferably written to the copyback cache storage unit. The header includes information that determines where the pending data block will ultimately be stored and which data blocks within the copyback cache storage unit are valid (i.e., have not yet been written to the array). The trailer is a copy of the header and is used to verify that the complete transfer occurred. As soon as the pending data block is stored in the copyback cache storage unit, the controller acknowledges successful completion of the Write operation to the CPU.

The information stored in the copyback cache storage unit is used only it there is a failure of the controller buffer. Otherwise, pending data blocks are read from the controller buffer when the pending data block is to be written to the array. Attempts to both Read and Write pending data blocks are preferably inhibited until the pending data block is written to the array. This simplifies operation of the present invention. However, in an alternative embodiment, Read and Write operations could be performed to and from the controller buffer by ensuring that the most recent information for a data block is read from the controller buffer both when transferring the pending data block from the controller buffer to the array and when satisfying a CPU Read request.

In the preferred embodiment, existing "hot spares" in a RAID system may be used as the copyback cache storage units. This allows implementation of the invention in existing systems by appropriately programming the array controller or controllers.

Operation of a RAID system having two or more controllers is similar to operation of the previously described embodiments of the present invention. However, if one of the copyback cache storage units fails or is called into service as a spare to replace a failed storage unit, then the present invention permits sharing of any of the remaining copyback cache storage units among the controllers. If only one spare unit was available to serve as a copyback cache storage unit, or if all of the spare units that were being used as copyback cache storage units have become unavailable, then in one embodiment of the present invention, a portion of each of the storage units that comprise the array is used to store a copy of each pending data block maintained in each controller buffer.

After a copy of a pending data block is stored in a storage unit, the controller associated with the logical array to which the pending data block will ultimately be stored indicates to the CPU that the Write operation is complete. In this way, there are always two copies of a pending data block before completion of a Write operation is acknowledged to the CPU.

Details of the Copyback Cache for Use with Multiple Controllers

Figure 4:
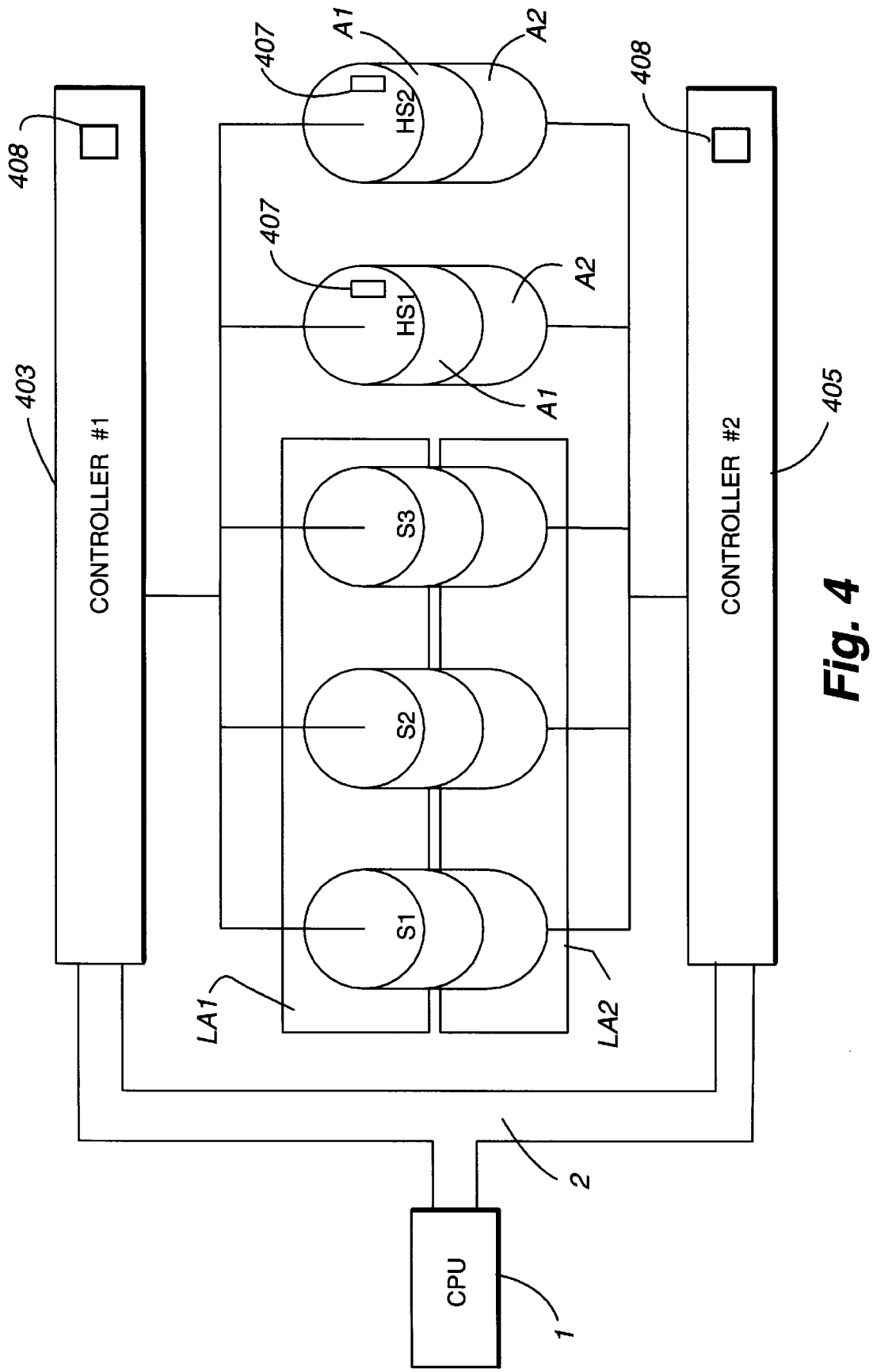
FIG. 4 is a block diagram of a copyback cache RAID system in accordance with an alternative embodiment of the present invention having multiple controllers.

FIG. 4 is a block diagram of a copyback cache system having multiple controllers, in accordance with an embodiment of the present invention. In the system shown in FIG. 4, a CPU 1 is coupled by a bus 2 to two array controllers 403, 405 (two controllers being shown by way of example only). Each controller 403, 405 is coupled to each of a plurality of storage units S1–S3 (3 being shown by way of example only) by an I/O bus (e.g., a SCSI bus). The array of storage units S1–S3 are failure independent. The array controllers 403, 405 are each essentially identical to the array controller 3 previously discussed. Each controller 403, 405 can independently read and write to each of the storage units S1–S3. In addition, each of the controllers 403, 405 are coupled by the I/O bus to fourth and fifth storage units HS1, HS2 which comprise "hot spares" for the array. Optionally, at least one of the storage units HS1, HS2 is a disk drive unit including a solid state track buffer 407. The inclusion of solid state track buffers 407 within a storage unit HS1, HS2 allows substantially faster Write times than would be possible by direct Writes to the rotating medium of the disk drive, since the disk drive acknowledges the completion of a Write to the storage unit as soon as the data block is written to the track buffer 407.

In the preferred embodiment of the present invention, the data storage units S1–S3 are logically configured as redundant logical arrays LA1, LA2 as described in co-pending U.S. patent application Ser. No. 07/852,374. The physical storage units S1–S3 are mapped into a plurality of logical storage units LS1–LS6. Each logical storage unit LS1–LS6 comprises non-overlapping groups of data blocks. The logical storage units LS1–LS6 are logically grouped into two logical arrays LA1, LA2. The two array controllers 403, 405 correspond one-to-one with the two logical arrays LA1, LA2 and interface the logical arrays LA1, LA2 with the CPU 1. When both controllers 403, 405 are functional, each logical array LA1, LA2 is under the control of a corresponding controller 403, 405. If a controller 403, 405 fails, the other controller 405, 403 assumes operational control of both logical arrays LA1, LA2.

In this embodiment of the present invention, a first copyback cache associated with a first of the logical arrays LA1 is maintained in the combination of (1) the controller buffer 408 of the array controller 403 associated with the first logical array, and (2) the HS1 storage unit, which maintains a copy of the pending data blocks stored in the copyback cache in the controller buffer 408 of the array controller 403. Similarly, a second copyback cache is maintained in the controller buffer 408 of the array controller 405 associated with the second logical array LA2 and HS2 storage unit.

Since each logical array LA1, LA2 is controlled by only one array controller 403, 405, both controllers 403, 405 can be active simultaneously without concern that data access "collisions" will occur. Furthermore, since each controller 403, 405 is assigned a unique copyback cache storage unit HS1, HS2 each controller 403, 405 can write pending data blocks to the copyback cache storage unit HS1, HS2 associated with that controller 403, 405.

Logical Organization of Copyback Cache Storage Units

In the preferred embodiment of a multiple controller version of the present invention, each active copyback cache storage unit HS1, HS2 is divided into a number of logical areas, each corresponding to a logical array. Therefore, if there are two controllers 403, 405 (as shown in FIG. 4), there will be two logical arrays LA1, LA2 and two logical areas A1, A2 within each copyback cache storage unit HS1, HS2. The copyback cache storage units HS1, HS2 are divided into a number of logical areas A1, A2 equal to the number of logical arrays to allow each controller 403, 405 to share one copyback cache storage unit without conflicting with each other if one copyback cache storage unit becomes unavailable. In the preferred embodiment of the present invention, the logical division of the copyback cache storage units HS1, HS2 is performed whenever the system logical configuration is determined or updated.

Each logical area A1, A2 within a copyback cache storage unit HS1, HS2 is further divided into a number of entries. Each valid entry contains a header, pending data block, and trailer. The length of the data block is limited to 63 sectors in one embodiment of the present invention. However, other embodiments may limit the number of sectors per entry to greater or lesser numbers of sectors. In the present embodiment, if a data block comprises more than 63 sectors, then an acknowledge that the Write operation is complete is not returned to the CPU 1 until the Read-Modify-Write is complete.

The header in a valid entry includes the correct logical volume, sector number, and number of sectors of the associated pending data block. This information identifies the location within the array to which the associated pending data block will ultimately be written. Each entry also includes a copy of a bit map that indicates which entries are valid, and a sequence number that indicates which entry has the most up-to-date bit map to be used if the associated controller buffer 408 fails.

The bit map stored in an entry is a copy of a bit map stored within the controller buffer 408 at the time the pending data block was written to the copyback cache storage unit HS1, HS2. These bit maps each comprise one bit corresponding to each entry in an associated copyback cache storage unit HS1, HS2. When an entry is valid (i.e,. there is a pending data block in the entry), the corresponding bit is set. When that entry becomes invalid (i.e., when the pending data block has been written completely and successfully to the storage units S1–S3 of the array), the corresponding bit is reset The manner in which the bit maps with each entry are managed is detailed below.

The sequence number within each header indicates when the bit map in the header was generated with respect to other bit maps in other headers. Thus, by comparing the sequence numbers stored in each entry of the copyback cache storage units HS1, HS2, the most up-to-date bit map can be found. By maintaining sequence numbers associated with each bit map, old bit maps need not be updated.

Normal Operation of the Copyback Cache with Multiple Controllers

Figure 5A:
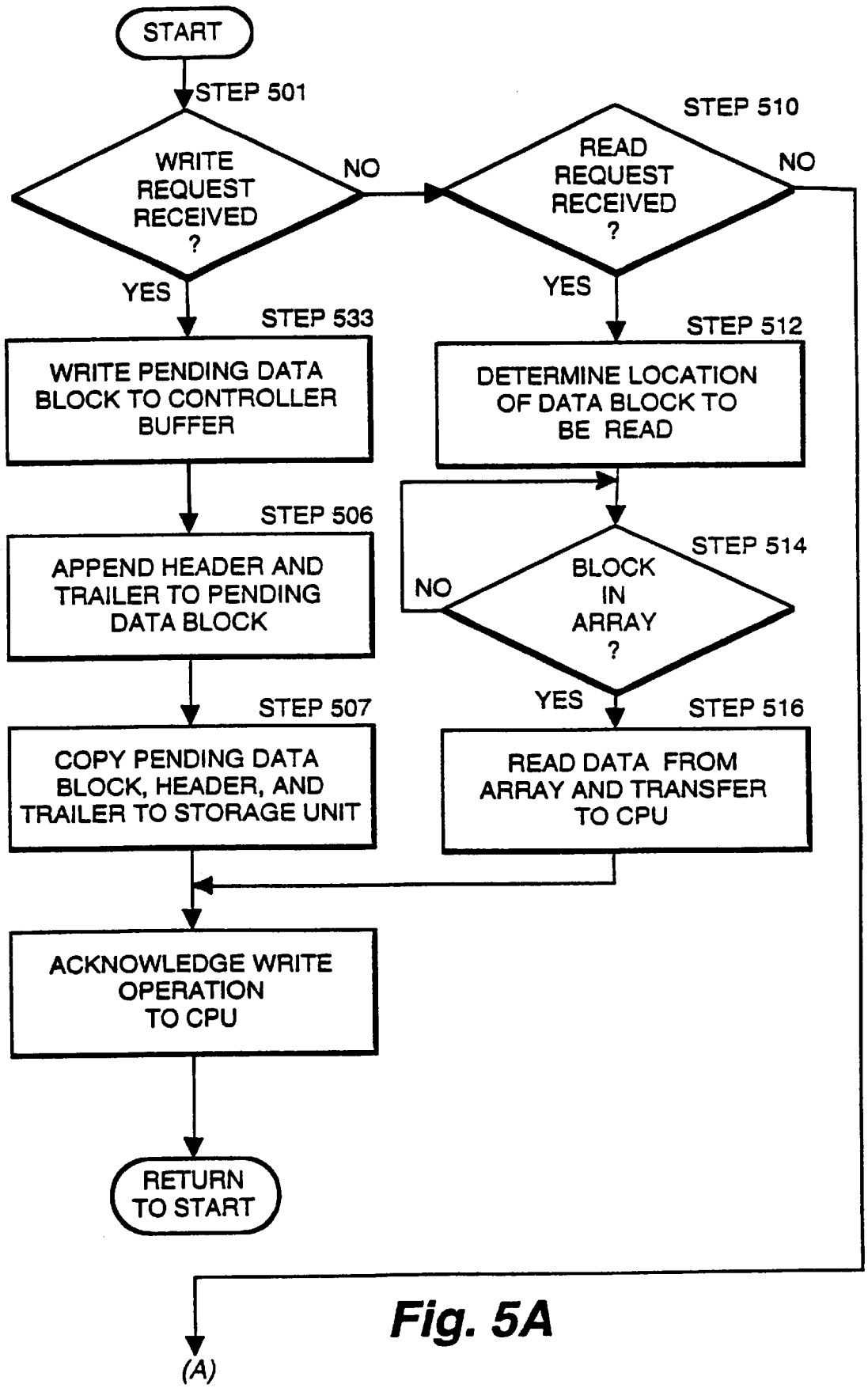
FIG. 5 is a high-level flow chart representing the steps of Read and Write operations for the embodiment of the invention in which a RAID system has multiple controllers.
Figure 5B:
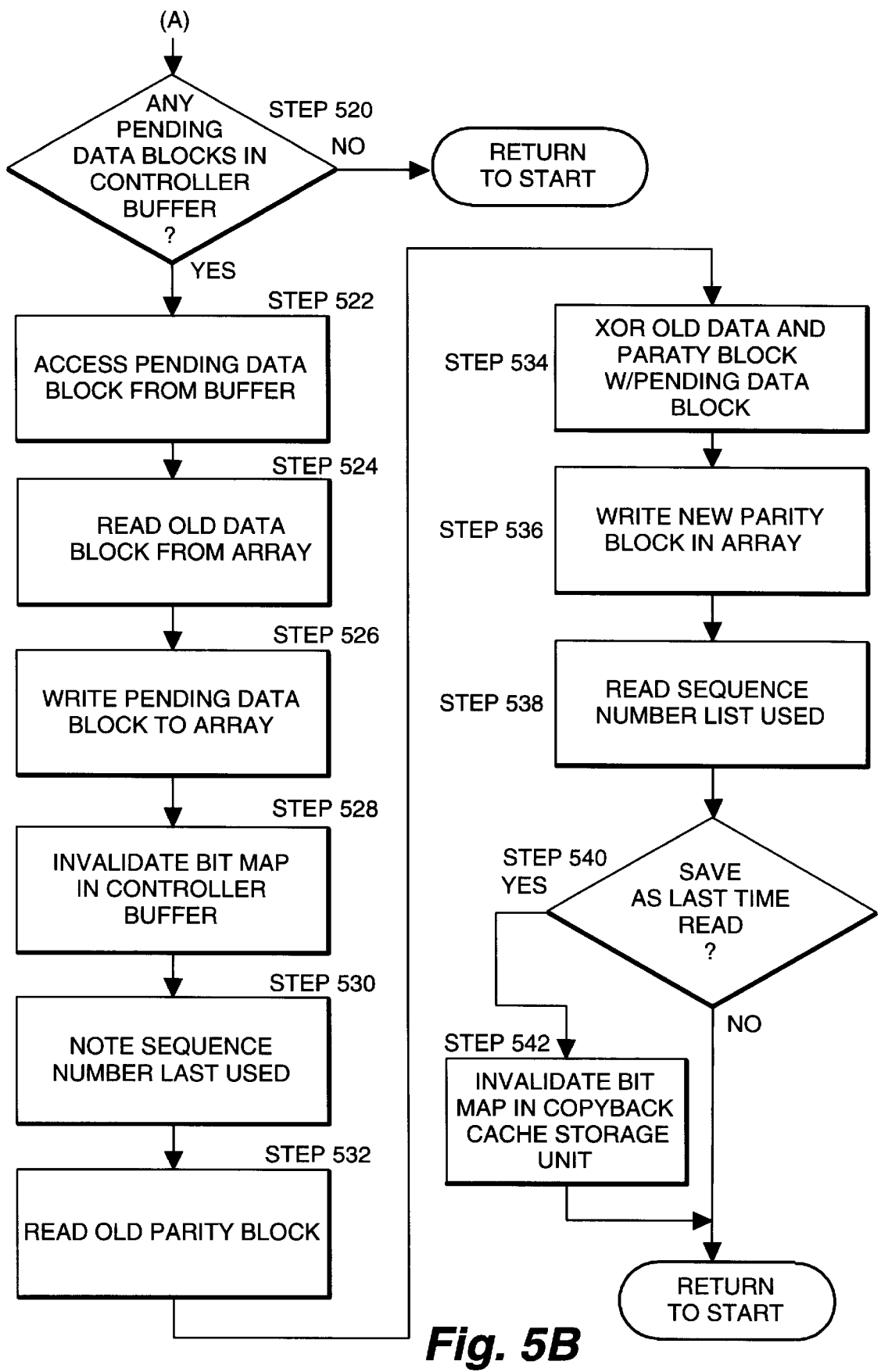

The present invention is preferably implemented as a computer program executed by each controller 403, 405. Each controller 403, 405 monitors Read and Write requests from the CPU 1 on essentially a continuous basis. Write requests are directed to either the first logical array LA1 (and thus the first controller 403) or the second logical array LA2 (and thus the second controller 405). FIG. 5 is a high level flow chart of the steps performed by controller 403, 405 when both controllers 403, 405, all storage units S1–S3, and at least two copyback cache storage units HS1, HS2 are operational. Since each controller 403, 405 performs essentially the same steps under these conditions, the steps are described below with respect to only one such controller 403.

Initially, the controller 403 determines whether a Write request has been received (STEP 501). If a Write request has been received, then the pending data block associated with the Write request is written to the controller buffer 408 (STEP 503). A header and trailer are then appended to a copy of the pending data block (STEP 505). The header includes an up-to-date version of the bit map which indicates which entries within the copyback cache storage unit HS1 are valid, including an indication that the entry to which the present pending data block is to be written is valid. The header also includes a sequence number to identify when the bit map was generated. The header, trailer, and pending data block are then written to an assigned entry within the copyback cache storage unit HS1 (STEP 507). If the header, trailer, and pending data block fit within the track buffer 407 (if a track buffer is present), then an acknowledge is sent to the CPU 1 immediately after the write to the track buffer 407 is complete. Otherwise, the acknowledge is sent only after the header, trailer, and pending data block have been completely written to the copyback cache storage unit HS1.

The controller 403 then returns to the start and again determines whether a Write request has been received (STEP 501). It no Write request has been received in (STEP 501), then the controller 403 determines whether a read request has been received (STEP 510). If a read request has been received, the controller 403 reads a location and pointer table and the bit map stored in the controller buffer 408 (STEP 512). The controller 403 determines whether the data block to be read is pending or has been successfully and completely written to a storage unit S1–S3 (STEP 514). If the data block has been completely and successfully written to a storage unit S1–S3, then the data block is read from the storage unit S1–S3 and transferred to the CPU 1 through the controller 403 (STEP 516). If, on the other hand, the data block has not yet been completely written to a storage unit S1–S3 (STEP 514), then the Read request is held up until the Write operation completes. Alternatively, the requested data can be read directly from the controller buffer 408. Once the write operation completes, the Read operation can be completed (STEP 516). Upon completion of the Read operation, the controller 403 returns to the start and again determines whether any Write requests have been received.

If no Write requests (STEP 501) or Read requests (STEP 510) have been received, then the controller 403 checks whether there are any pending data blocks in the controller buffer 408 (STEP 520). If at least one pending data block is present in the controller buffer 408, then the pending data block that was written to the controller buffer 408 first is read from the controller buffer 408 (STEP 522). The old data block is read from the storage units S1–S3 (STEP 524). The pending data block is then written to the storage unit S1–S3 (STEP 526). The controller 403 then invalidates the entry within the bit map stored in the controller buffer 408 to indicate that the data in that entry has been completely written to the storage units S1–S3 (STEP 528). The sequence number that was last used is then noted by the controller 403 (STEP 530). The old parity block is then read (STEP 532). The old parity block is XOR'd with the old data (to "remove" the information content of the old data), and the resulting sum is then XOR'd with the new data (to provide new parity information) (STEP 534). The new parity block is then written to the appropriate storage unit S1–S3 (STEP 536).

After the new parity block has been written, the controller 403 reads the last used sequence number again (STEP 538). That number is then compared with the sequence number that was previously read in STEP 532 (STEP 540). If the numbers are not the same, indicating that another pending data block has been written to the copyback cache storage unit HS1, then the controller 403 returns to the start without modifying the bit map. If the numbers are the same, then the bit map stored in the header of the entry associated with that sequence number must be updated to reset the bit associated with the entry to indicate that the entry is invalid (STEP 542). The controller 403 then returns to the start after invalidating the bit map in the copyback cache storage unit HS1. The bit map only needs to be updated when no other entry was made to the copyback cache storage unit between STEP 530 and STEP 538. Therefore, the fact that a second write is required to update the bit map is not very significant, since the fact that no other entry was made indicates that the system is not very busy. However, if the system is busy, then it is likely that another entry will occur between STEP 530 and STEP 538, and it will not be necessary to update the bit map.

In the present invention, a system parameter can be either manually set or automatically set to prevent pending data blocks from being written to a copyback cache. The present invention is automatically prevented from writing data blocks to the cache if a predetermined number of data blocks are already pending. This is preferable because the use of the copyback cache in such circumstances requires more activity than is required when data blocks are written directly into the array. Therefore, when the system is very active over a sustained period of time, the number of pending data blocks can become excessive. The benefit of the system is only obtained if there are relatively inactive periods during which the pending data blocks can be written to the array. Therefore, the present invention monitors the number of pending data blocks to ensure that the number does not become excessive. The exact number of data blocks to be considered excessive is dependent upon particular system characteristics, such as the type of I/O bus, and the seek times of the storage units.

Furthermore, the system can be manually instructed to write directly to a particular logical array LA1, LA2 (i.e., the copyback cache can be "turned off"). When the copyback cache of a logical array is turned off, new pending data blocks are no longer written to the copyback cache storage unit. As each pending data block is written to the array, the bit map in the controller buffer is updated to indicate that the entry to the copyback cache is invalid. When the last entry is invalidated, the copyback cache storage unit is returned to a "NOT USED" state (unless it is still being used by the other logical array). During the time that the copyback cache is turned off, but entries remain valid, Reads and Writes to the pending data blocks of the valid entries are held up until the pending data blocks are written to the array.

When the copyback cache is first turned on, the controller 403, 405 preferably searches for a storage unit in "NOT USED" state. If such a storage unit is found, then that storage unit is used as the copyback cache storage unit and the state of the storage unit is updated to "COPYBACK CACHE USED". If there are no storage units in the "NOT USED" state, then the controller 403, 405 searches for a storage unit in the "COPYBACK CACHE USED" state and determines whether that storage unit can be shared.

Figure 6:
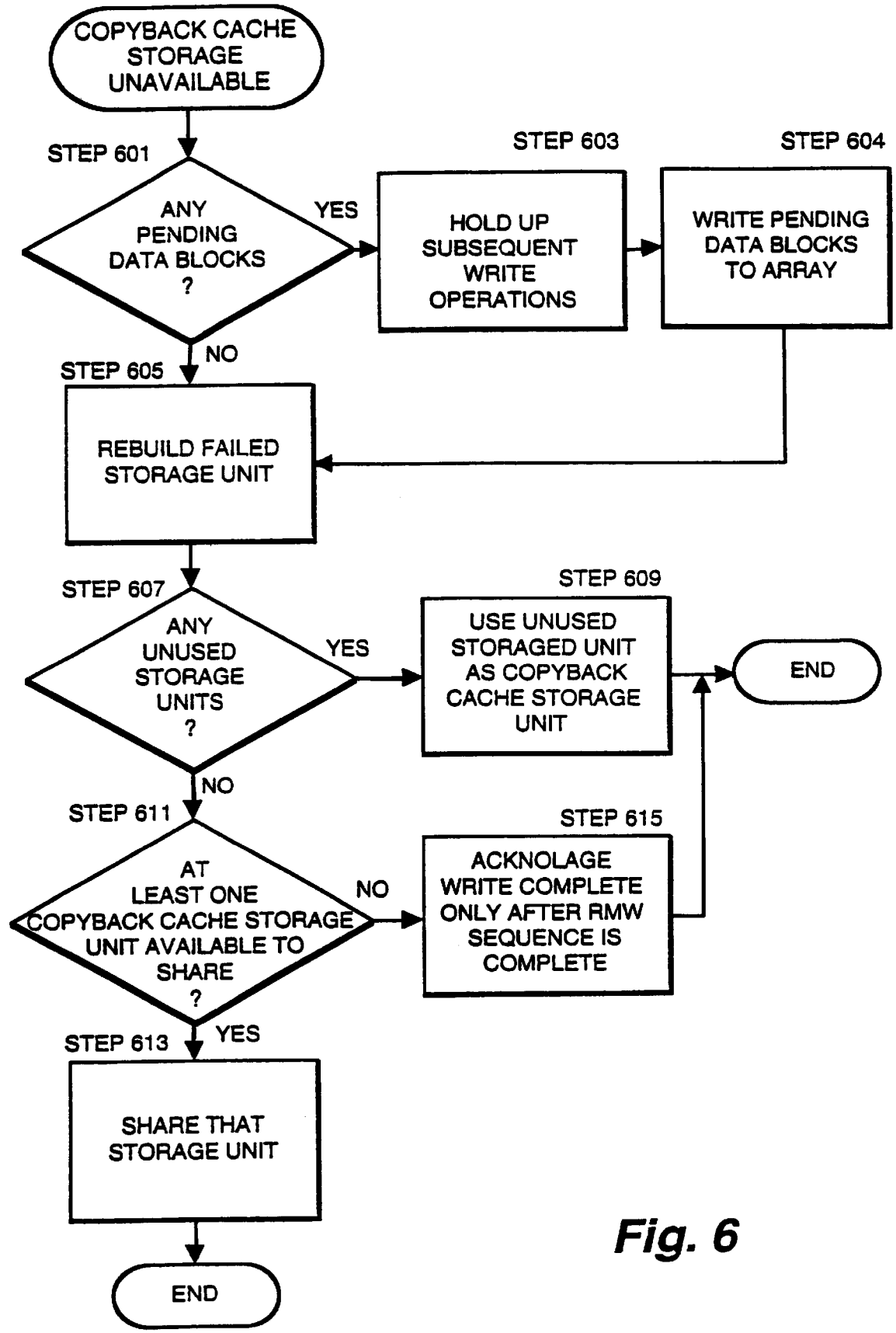
FIG. 6 is a high level flow chart of the steps taken in accordance with the present invention when a copyback cache storage unit becomes unavailable.

Operation of the Copyback Cache with Multiple Controller Upon Loss of a Copyback Cache Storage Unit FIG. 6 is a high level flow chart of the steps taken in accordance with the present invention when a copyback cache storage unit becomes unavailable. For example, a hot spare storage unit HS1 being used as a copyback cache storage unit may become unavailable because of a failure of one of the other storage units S1–S3. In such a case, preferably, HS1 is arbitrarily selected to replace a failed storage unit S1–S3. However, in an alternative embodiment, the storage unit HS1 or HS2 containing the fewest pending data blocks may be selected to replace a failed storage unit S1–S3.

In one embodiment of the present invention, when such a failure occurs, the controller 403 associated with the storage unit HS1 that is to replace the failed storage unit determines whether any data blocks are pending (STEP 601). All pending data blocks written to the logical array LA1 associated with the copyback cache storage unit HS1 are written to the remaining operational storage units S1–S3 before any subsequent Read or Write requests to that logical array LA1 are processed (STEP 603). Once each entry in storage unit HS1 is invalid (i.e., each pending data block associated with the storage unit HS1 have been completely written to the array), the failed storage unit is rebuilt on the storage unit HS1 (STEP 605). After the failed storage unit has been rebuilt, the controller 403 determines whether there is another unused storage unit available to serve as the copyback cache storage unit for the logical array LA1 which is now without a copyback cache storage unit (STEP 607). If there is such a storage unit available, that storage unit is used (STEP 609). Otherwise, the controller 403 determines whether there is at least one copyback cache storage unit having an unused area that can be shared (STEP 611). If there is such a copyback cache storage unit then that unit is shared, such that each logical array LA1, LA2 and associated controller is assigned a unique, non-overlapping area A1, A2 of the storage unit (STEP 613). Thus, Read and Write operations can proceed generally in the manner illustrated in the flow chart of FIGS. 5A and 5B. If there are no storage units to be shared, then subsequent Write requests to the affected array controller are not acknowledged to the CPU 1 until the entire Read-Modify-Write operation is completed.

For example, in the system illustrated in FIG. 4, if storage unit S1 fails, then the storage unit HS1 replaces the failed storage unit S1. Once the pending data blocks have been completely written to storage units S2 and S3, the remaining storage unit HS2 is used by both logical arrays LA1, LA2 as a copyback cache storage unit. Each of the two areas A1, A2 of the storage unit HS2 are dedicated to a corresponding logical array. Therefore, the first area A1, of the storage unit HS2 is reserved for entries that are associated with the first logical array LA1, and the second area A2 of the storage unit HS2 is reserved for entries that are associated with the second logical array LA2.

When a new storage unit is installed to replace a failed storage unit, the data from the replacement storage unit HS1 is copied to the new storage unit. The replacement storage unit HS1 is then returned to a "NOT USED" state. At that time the controller 403, 405 will return to using the storage unit HS1 as a copyback cache storage unit if there are fewer copyback cache storage units operating than there are logical arrays.

In order to ensure that the optimal number of copyback cache storage units are being used (i.e., one per logical array), when a configuration change is detected by a controller 403, 405, the controller 403, 405 turns off the copyback cache, and then turns the copyback cache back on. This causes each controller 403, 405 to search for a "NOT USED" storage unit regardless of what the controller was using as a copyback cache storage unit before the configuration change occurred.

Spread Copyback Cache Embodiment

Figure 7:
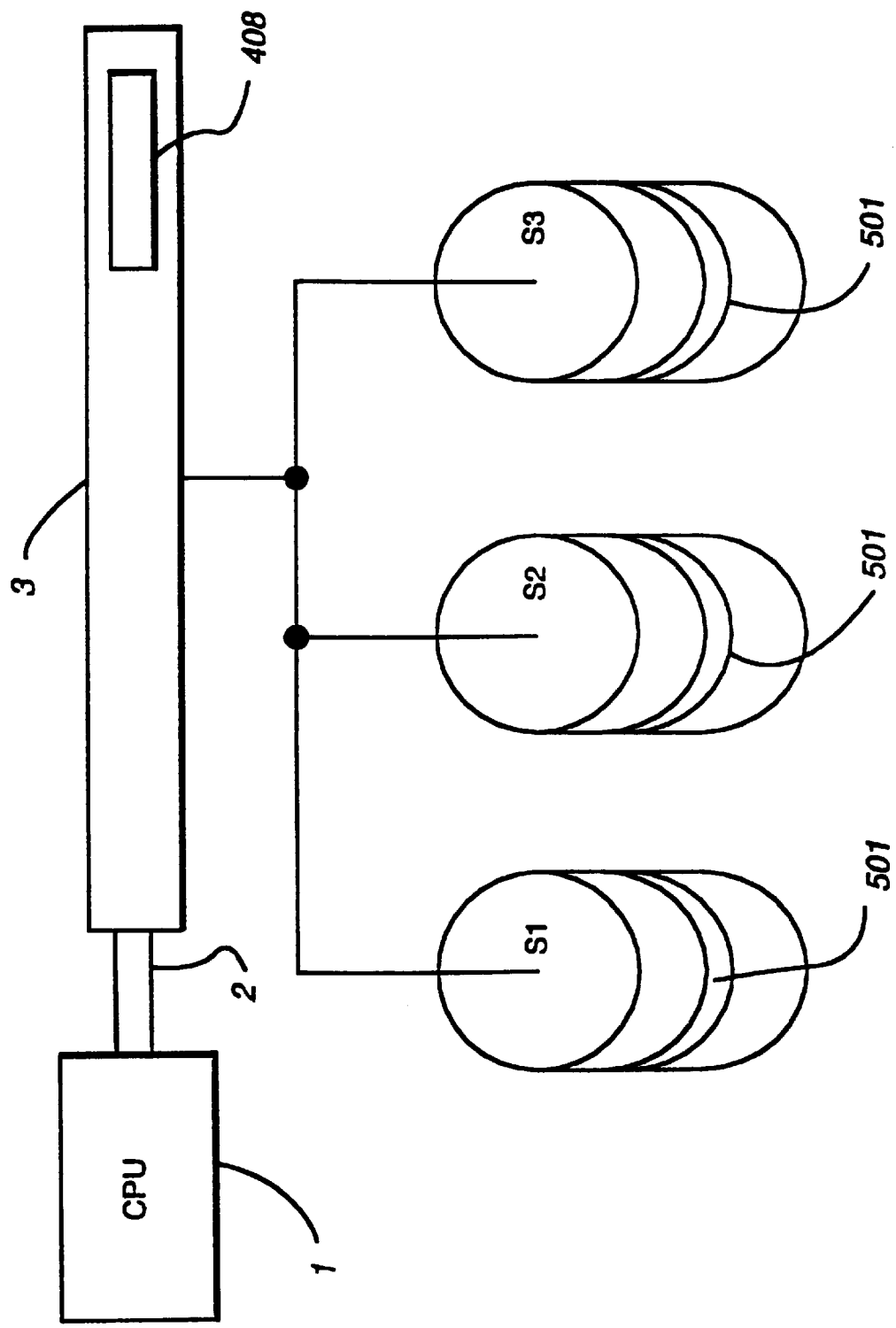
FIG. 7 is a block diagram of a RAID system in accordance with another embodiment of the present invention, in which pending data blocks are spread over a number of storage units that comprise the array.

In another embodiment of the present invention, illustrated in FIG. 7, a controller 3 spreads entries to a logical copyback cache storage unit 501 across the physical storage units that comprise the array. This embodiment operates in substantially the same way as the embodiment described in the flow chart shown in FIGS. 5A and 5B, except that the copyback cache storage unit 501 is a logical storage unit rather than a physical storage unit. The logical storage unit comprises at least one stripe of blocks. In one embodiment of the present invention, entries may be spread across the physical storage units if the storage unit being used as a copyback cache storage unit becomes unavailable. For example, a system which utilizes a hot spare as a copyback cache storage unit, as described above, may spread data across the physical storage units upon a failure of a storage unit which makes the copyback cache storage unit unavailable.

Again, although the invention has been described in terms of a sequential branching process, the invention may also be implemented in a multi-tasking system as separate tasks executing concurrently. Accordingly, the tests indicated by Steps 501, 510, and 520 in FIGS. 5A and 5B may be implicitly performed in the calling of the associated tasks for Writing and Reading data blocks, and transfer of pending blocks.

A number of embodiments of the present invention have been described. Nevertheless, it will be understood that various modifications may be made without departing from the spirit and scope of the invention. For example, the present invention can be used with RAID 3, RAID 4, or RAID 5 systems. Furthermore, an error-correction method in addition to or in lieu of XOR-generated parity may be used for the necessary redundancy information. One such method using Reed-Solomon codes is disclosed in U.S. patent application Ser. No. 270,713, filed Nov. 14, 1988, entitled "Arrayed Disk Drive System and Method" and commonly assigned.

As another example, the copyback cache storage unit CC may be attached to the controller 3 through a dedicated bus, rather than through the preferred common I/O bus (e.g., a SCSI bus).

Accordingly, it is to be understood that the invention is not to be limited by the specific illustrated embodiment, but only by the scope of the appended claims.

We claim:

1. A fault-tolerant storage device array including:
   a. a plurality of failure independent storage units for storing information as stripes of blocks, including at least data blocks and associated error-correction blocks;
   b. at least one copyback cache storage unit for temporarily storing data blocks; and
   c. a storage unit controller, coupled to the plurality of storage units and to the at least one copyback cache storage unit, including control means for:
      (1) writing received data blocks initially onto the at least one copyback cache storage unit as pending data blocks;
      (2) during idle time of at least some of the plurality of storage units:
         (a) reading at least one pending data block from at least one copyback cache storage unit;
         (b) accessing the storage units and reading information corresponding to each read pending data block;
         (c) generating an associated error-correction block from the read information and each read pending data block; and
         (d) writing each such read pending data block and associated error-correction block to a corresponding stripe of the idle storage units; and
      (3) acknowledging completion of writing each received data block to the at least one copyback cache storage unit before writing such data block to one of the storage units.

2. The storage device array of claim 1, wherein the information corresponding to each read pending data block includes a corresponding old error-correction block and corresponding old data block read from the corresponding stripe of idle storage units.

3. The storage device array of claim 1, wherein generating an error-correction block further includes:
   a. reading a corresponding old data block from the corresponding stripe of the idle storage units;
   b. reading a corresponding old error-correction block from the corresponding stripe of the idle storage units; and
   c. exclusively-ORing the old data block, the old error correction block and the read pending data block, thereby generating a new error-correction block.

4. The fault-tolerant storage device array of claim 1, wherein at least one copyback cache storage unit is non-volatile.

5. A fault-tolerant storage device array including:
   a. a plurality of failure independent storage units for storing information as stripes of blocks, including at least data blocks and associated error-correction blocks;
   b. at least one copyback cache storage unit for temporarily storing data blocks, at least one of said at least one copyback cache storage unit being non-volatile; and
   c. a storage unit controller, coupled to the plurality of storage units and to the at least one copyback cache storage unit, including control means for:
      (1) writing received data blocks initially onto the at least one copyback cache storage unit as pending data blocks;
      (2) during idle time of at least some of the plurality of storage units:
         (a) reading at least one pending data block from at least one copyback cache storage unit;
         (b) accessing the storage units and reading information corresponding to each read pending data block;
         (c) generating an associated error-correction block from the read information and each read pending data block; and
         (d) writing each such read pending data block and associated error-correction block to a corresponding stripe of the idle storage units.

6. The storage device array of claim 5, wherein the control means acknowledges completion of writing each received data block to the at least one copyback cache storage unit before writing such data block to one of the storage units.

7. The storage device array of claim 6, wherein the information corresponding to each read pending data block includes a corresponding old error-correction block and corresponding old data block read from the corresponding stripe of idle storage units.

8. The storage device array of claim 7, wherein generating an error-correction block further includes:
   a. reading a corresponding old data block from the corresponding stripe of the idle storage units;
   b. reading a corresponding old error-correction block from the corresponding stripe of the idle storage units; and
   c. exclusively-ORing the old data block, the old error correction block and the read pending data block, thereby generating a new error-correction block.

9. A fault-tolerant storage device array including:
   a. a plurality of failure independent storage units for storing information as stripes of blocks, including at least data blocks and associated error-correction blocks;

b. at least one copyback cache storage unit for temporarily storing data blocks, at least one of said at least one copyback cache storage unit being non-volatile; and c. a storage unit controller, coupled to the plurality of storage units and to the at least one copyback cache storage unit, including control means for:

(1) writing received data blocks initially onto the at least one copyback cache storage unit as pending data blocks;

(2) during idle time of at least some of the plurality of storage units:

(a) reading at least one pending data block from at least one copyback cache storage unit;

(b) accessing the storage units and reading information corresponding to each read pending data block;

(c) generating an associated error-correction block from the read information and each read pending data block; and (d) writing each such read pending data block and associated error-correction block to a corresponding stripe of the idle storage units; and (3) acknowledging completion of writing each received data block to the at least one copyback cache storage unit before writing such data block to one of the storage units.

10. The storage device array of claim 9, wherein the information corresponding to each read pending data block includes a corresponding old error-correction block and corresponding old data block read from the corresponding stripe of idle storage units.

11. The storage device array of claim 9, wherein generating an error-correction block further includes:

a. reading a corresponding old data block from the corresponding stripe of the idle storage units;

b. reading a corresponding old error-correction block from the corresponding stripe of the idle storage units; and c. exclusively-ORing the old data block, the old error correction block and the read pending data block, thereby generating a new error-correction block.

12. A fault-tolerant storage device array including:

a. a plurality of failure independent storage units for storing information as stripes of blocks, including at least data blocks and associated error-correction blocks;

b. at least one copyback cache storage unit for temporarily storing data blocks; and c. a storage unit controller, coupled to the plurality of storage units and to the at least one copyback cache storage unit, including control means for:

(1) writing received data blocks initially onto the at least one copyback cache storage unit as pending data blocks;

(2) reading at least one pending data block from at least one copyback cache storage unit;

(3) accessing the storage units and reading information corresponding to each read pending data block;

(4) generating an associated error-correction block from the read information and each read pending data block;

(5) writing each such read pending data block and associated error-correction block to a corresponding stripe of the storage units; and (6) acknowledging completion of writing each received data block to the at least one copyback cache storage unit before writing such data block to one of the storage units.

13. The storage device array of claim 12, wherein the information corresponding to each read pending data block includes a corresponding old error-correction block and corresponding old data block read from the corresponding stripe of the storage units.

14. The storage device array of claim 12, wherein generating an error-correction block further includes:

a. reading a corresponding old data block from the corresponding stripe of the storage units;

b. reading a corresponding old error-correction block from the corresponding stripe of the storage units; and c. exclusively-ORing the old data block, the old error correction block and the read pending data block, thereby generating a new error-correction block.

15. The storage device array of claim 12, wherein at least one copyback cache storage unit is non-volatile.

16. The storage device array of claim 12, wherein said storage unit controller further includes control means for reading requested data blocks from at least one copyback cache storage unit when such requested data blocks have not been written to the plurality of storage units, otherwise from the plurality of storage units.

17. A fault-tolerant storage device array including:

a. a plurality of failure independent storage units for storing information as stripes of blocks, including at least data blocks and associated error-correction blocks;

b. at least one copyback cache storage unit for temporarily storing data blocks, at least one of said at least one copyback cache storage unit being non-volatile; and c. a storage unit controller, coupled to the plurality of storage units and to the at least one copyback cache storage unit, including control means for:

(1) writing received data blocks initially onto the at least one copyback cache storage unit as pending data blocks;

(2) reading at least one pending data block from at least one copyback cache storage unit;

(3) accessing the storage units and reading information corresponding to each read pending data block;

(4) generating an associated error-correction block from the read information and each read pending data block; and (5) writing each such read pending data block and associated error-correction block to a corresponding stripe of the storage units.

18. The storage device array of claim 17, wherein the control means acknowledges completion of writing each received data block to the at least one copyback cache storage unit before writing such data block to one of the storage units.

19. The storage device array of claim 18, wherein the information corresponding to each read pending data block includes a corresponding old error-correction block and corresponding old data block read from the corresponding stripe of the storage units.

20. The storage device array of claim 19, wherein generating an error-correction block further includes:

a. reading a corresponding old data block from the corresponding stripe of the storage units;

b. reading a corresponding old error-correction block from the corresponding stripe of the storage units; and c. exclusively-ORing the old data block, the old error correction block and the read pending data block, thereby generating a new error-correction block.

21. The storage device array of claim 17, wherein said storage unit controller further includes control means for reading requested data blocks from at least one copyback cache storage unit when such requested data blocks have not been written to the plurality of storage units, otherwise from the plurality of storage units.

22. A fault-tolerant storage device array including:
  a. a plurality of failure independent storage units for storing information as stripes of blocks, including at least data blocks and associated error-correction blocks;
  b. at least one copyback cache storage unit for temporarily storing data blocks, at least one of said at least one copyback cache storage unit being non-volatile; and
  c. a storage unit controller, coupled to the plurality of storage units and to the at least one copyback cache storage unit, including control means for:
    (1) writing received data blocks initially onto the at least one copyback cache storage unit as pending data blocks;
    (2) reading at least one pending data block from at least one copyback cache storage unit;
    (3) accessing the storage units and reading information corresponding to each read pending data block;
    (4) generating an associated error-correction block from the read information and each read pending data block;
    (5) writing each such read pending data block and associated error-correction block to a corresponding stripe of the storage units; and
    (6) acknowledging completion of writing each received data block to the at least one copyback cache storage unit before writing such data block to one of the storage units.

23. The storage device array of claim 22, wherein the information corresponding to each read pending data block includes a corresponding old error-correction block and corresponding old data block read from the corresponding stripe of the storage units.

24. The storage device array of claim 22, wherein generating an error-correction block further includes:
  a. reading a corresponding old data block from the corresponding stripe of the storage units;
  b. reading a corresponding old error-correction block from the corresponding stripe of the storage units; and
  c. exclusively-ORing the old data block, the old error correction block and the read pending data block, thereby generating a new error-correction block.

25. The storage device array of claim 22, wherein said storage unit controller further includes control means for reading requested data blocks from at least one copyback cache storage unit when such requested data blocks have not been written to the plurality of storage units, otherwise from the plurality of storage units.

* * * * *